US010944226B2

(12) United States Patent
Justin et al.

(10) Patent No.: US 10,944,226 B2
(45) Date of Patent: Mar. 9, 2021

(54) CONNECTOR SYSTEM FOR CHARGING A DEVICE USING A CHARGING RECEPTACLE

(71) Applicant: Dell Products L.P., Round Rock, TX (US)

(72) Inventors: Wong Hin Loong Justin, Singapore (SG); Kai Leong Wong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/254,938

(22) Filed: Jan. 23, 2019

(65) Prior Publication Data

US 2020/0235540 A1 Jul. 23, 2020

(51) Int. Cl.
| | |
|---|---|
| H01R 33/76 | (2006.01) |
| H01R 31/06 | (2006.01) |
| H02J 7/00 | (2006.01) |
| G06F 1/16 | (2006.01) |
| H01R 13/62 | (2006.01) |

(52) U.S. Cl.
CPC ....... *H01R 33/7685* (2013.01); *G06F 1/1632* (2013.01); *H01R 31/06* (2013.01); *H01R 33/7664* (2013.01); *H02J 7/00* (2013.01); *H02J 7/0045* (2013.01); *H01R 13/6205* (2013.01)

(58) Field of Classification Search
CPC ............ H01R 33/7685; H01R 33/7664; H01R 31/06; H01R 13/6205; G06F 1/1632; H02J 7/0045; H02J 7/00; H02J 2007/0062
See application file for complete search history.

(56) References Cited

U.S. PATENT DOCUMENTS

| 9,331,444 B2 * | 5/2016 | Carnevali ............. G06F 1/1628 |
| 9,413,087 B2 * | 8/2016 | Shariff ............... H01R 13/6205 |
| 9,548,559 B2 * | 1/2017 | Zhou ................... H01R 13/6205 |

(Continued)

OTHER PUBLICATIONS

Sparkfun, "Connector Basics," downloaded from https://learn.sparkfun.com/tutorials/connector-basics/, Jan. 8, 2019, 21 pages.

(Continued)

*Primary Examiner* — Abdullah A Riyami
*Assistant Examiner* — Nader J Alhawamdeh
(74) *Attorney, Agent, or Firm* — Zagorin Cave LLP

(57) ABSTRACT

A connector system enables charging of a portable information handling system in a charging dock. The connector system has improved tolerance to misalignment of male and female connectors to facilitate engagement when the portable information handling system is inserted into a charging dock. An embodiment of a receptacle adapter is disposed such that there is only one orientation for power connector engagement. An embodiment of the charging dock has an angular tilt that causes a partial weight component of the portable computer to contribute to positive engagement of the external plug adapter and receptacle adapter. An embodiment of the connector system includes a power interface including conductive pads and pogo pins. The conductive pads have contact surfaces that tolerate alignment variation between the pogo pins and the conductive pads. An embodiment of the connector system is a USB Type-C power adapter connector system.

20 Claims, 15 Drawing Sheets

(56) References Cited

U.S. PATENT DOCUMENTS

| | | | |
|---|---|---|---|
| 9,857,837 B1* | 1/2018 | VanKirk | G06F 1/1635 |
| 2016/0181734 A1* | 6/2016 | Kao | H01R 13/6585 |
| | | | 439/607.05 |
| 2017/0371374 A1* | 12/2017 | Carnevali | G06F 1/1632 |

OTHER PUBLICATIONS

Wikipedia, "USB-C," downloaded from https://en.wikipedia.org/w/index.php?title=USB-C&oldid=878498424, Jan. 18, 2019, 19 pages.

* cited by examiner

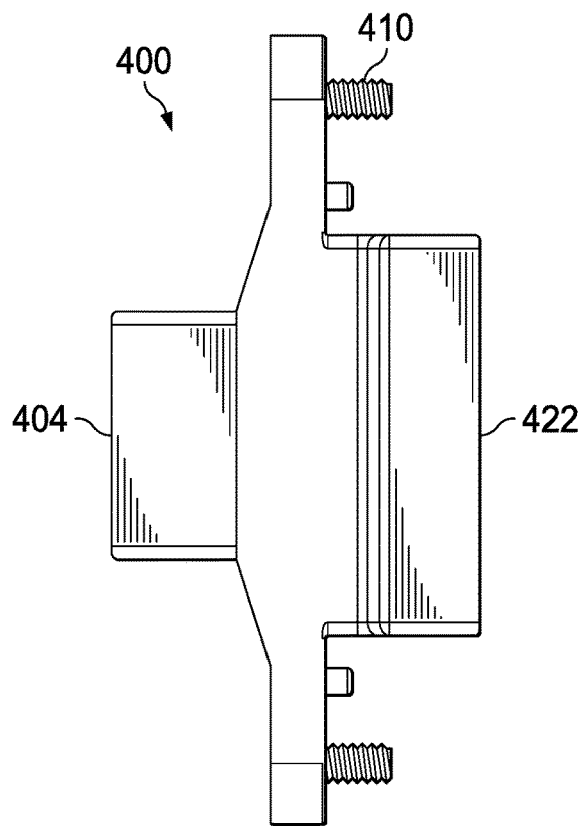
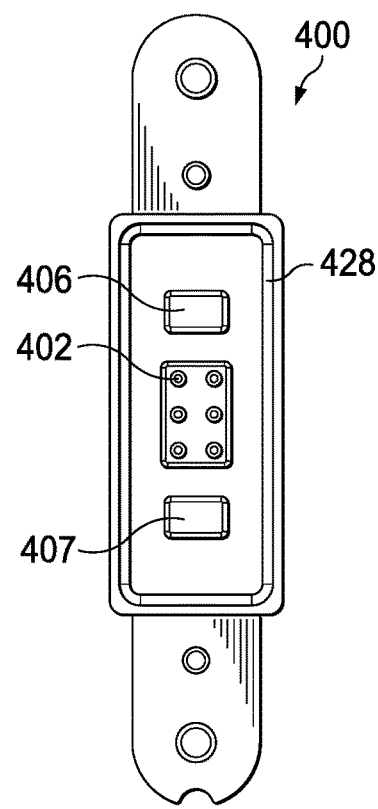
FIG. 8  FIG. 9
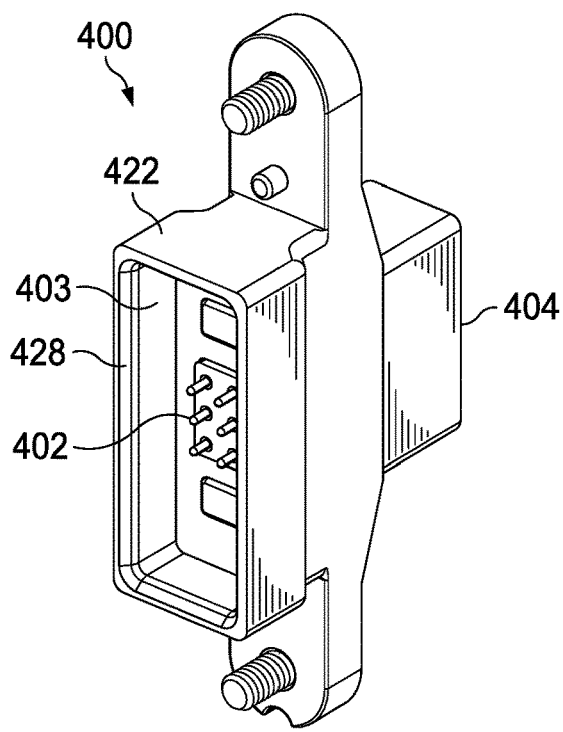
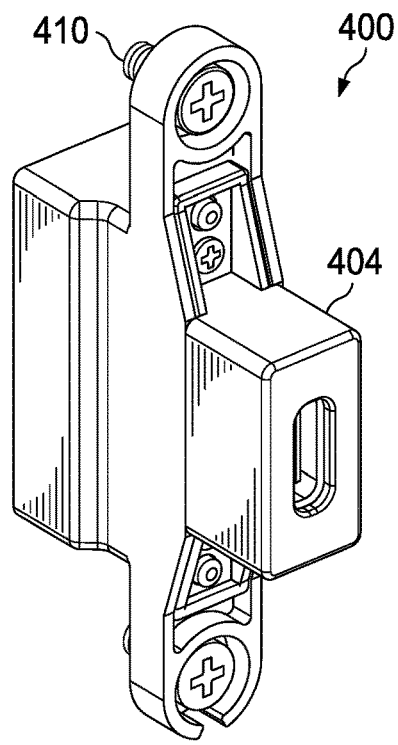
FIG. 10  FIG. 11

CONNECTOR SYSTEM FOR CHARGING A DEVICE USING A CHARGING RECEPTACLE

BACKGROUND

Field of the Invention

The present invention relates to information handling systems, and more particularly to a connector system for a portable information handling system.

Description of the Related Art

A conventional charging dock provides a robust power interface for charging a portable information handling system (e.g., laptop computer, notebook computer, tablet computer). A user inserts the portable information handling system into a segment of the charging dock for engagement of a power interface to enable charging of an energy storage device of the portable information handling system (e.g., a battery). Exemplary power connectors include a single circular 7.4 mm barrel connector or a 7.6 mm barrel connector having a single circular X-axis datum scheme that engages an electrical interface port (e.g., Type-C) of the portable information handling system. A conventional 7.4 mm barrel connector is made from an extruded circular portion with 1.2 mm steel material. The portable information handling system also includes one or more additional electrical interface ports for communicating with peripheral devices e.g., Universal Serial Bus (USB)). However, advances in information handling systems use an electrical interface port (e.g., USB Type-C) that operates as a power delivery port in one mode and operates as a peripheral communications port in another mode. USB Type-C is a 24-pin USB connector system. It has a two-fold rotationally-symmetrical connector. However, typical USB Type-C male and female connectors have low tolerance to misalignment (e.g., less than 0.25 mm tolerance in a Z-dimension and a Y-dimension) to enable engagement.

Referring to FIG. 1, a conventional USB Type-C connector housing is made from 0.6 mm pressed steel material. The datum scheme of an exemplary two-fold rotationally-symmetrical USB Type-C slot-shaped mating connector requires alignment in the Z-dimension and the Y-dimension and is less tolerant of misalignment as compared to a conventional circular barrel X-axis datum scheme. For example, a slight tilt of the connector about an X-axis can rotate the slot shape profile of the connector to exceed an 0.25 mm tolerance. Furthermore, use of covers of the portable information handling system as surfaces to align a female USB Type-C receptacle adapter to a male USB Type-C connector exacerbates assembly error to exceed the 0.25 mm error tolerated by the USB Type-C connector system.

Referring to FIG. 2, conventional power adapters for micro-USB, USB Type-C, and Lightning connectors include magnetic adapter 204 that couples to power adapter 202 to charge portable phones or small tablet computers. The resulting interface allows engagement with 0 degree or 180 degree orientation of the power adapter overmold. Magnetic adapter 204 has a small form factor since power specifications for portable phones and small tablet computers are relatively low as compared to other portable information handling systems (e.g., small 11-inch or 12-inch laptop computers or notebook computers). However, these power adapters do not satisfy power specifications of larger portable systems.

In general, USB Type-C connectors (e.g., male interface or female interface) are not robust as compared to a 7.4 mm barrel connector. For example, if a USB Type-C connector is not properly aligned before engagement, the male USB Type-C connector or the female USB Type-C connector can be damaged. Repair to the female USB Type-C connector in a daughterboard printed circuit assembly (PCA) of a portable information handling system can be expensive. Accordingly, improved connector systems for charging are desired.

SUMMARY OF EMBODIMENTS OF THE INVENTION

In at least one embodiment of the invention, an information handling system includes a connector system. The connector system includes a first electronic interface consistent with a protocol including power supply terminals and other terminals and having a first mating designation. The connector system includes a misalignment-tolerant interface coupled to the power supply terminals of the first electronic interface. The misalignment-tolerant interface is configured to provide electrical and mechanical connection of the power supply terminals to corresponding conductors of the connector system. The connector system may be configured to couple to a port of the information handling system. The connector system may further include an external plug adapter including a housing mechanically coupling the first electronic interface and the misalignment-tolerant interface. The connector system may further include a first flexible rib extending along a surface of the housing and a second flexible rib extending along the surface of the housing. The first flexible rib may have a first height and the second flexible rib may have a second height. The second height may be different from the first height. The first electronic interface may be disposed between the first flexible rib and the second flexible rib. The protocol may be a Universal Serial Bus (USB) Type-C protocol.

In at least one embodiment of the invention, an external plug adapter includes a first electronic interface consistent with a protocol including power supply terminals and other terminals and having a first mating designation. The external plug adapter includes conductive pads coupled to the power supply terminals of the first electronic interface. The conductive pads provide electrical and mechanical connection to a receptacle adapter. The conductive pads include a first row of conductive pads disposed adjacent to a second row of conductive pads. The second row of conductive pads is coupled to signals corresponding to signals of adjacent conductive pads of the first row of conductive pads. The external plug adapter includes a housing mechanically coupling the first electronic interface and the conductive pads. The conductive pads may be sized to have at least 0.25 mm tolerance in a Y-dimension and in a Z-dimension for electrical and mechanical contact with corresponding conductive pins of a receptacle adapter.

In at least one embodiment of the invention, a charging dock includes a receptacle adapter. The receptacle adapter includes a first electronic interface consistent with a protocol including power supply terminals and other terminals and having a first mating designation. The receptacle adapter includes conductive pins coupled to the power supply terminals of the first electronic interface. The conductive pins are configured to connect to conductive pads on an external plug adapter. The receptacle adapter includes a housing enclosing the first electronic interface and the conductive pins. The receptacle adapter is disposed in the charging dock with an angular tilt between a first axis of the receptacle adapter and a second axis of the charging dock. The second axis is through a base of the charging dock.

BRIEF DESCRIPTION OF THE DRAWINGS

The present invention may be better understood, and its numerous objects, features, and advantages made apparent to those skilled in the art by referencing the accompanying drawings.

FIG. 8 illustrates a top-down view of a receptacle adapter consistent with at least one embodiment of the invention.

FIG. 9 illustrates a host-side view of the receptacle adapter of FIG. 8 consistent with at least one embodiment of the invention.

FIG. 10 illustrates a perspective, host-side view of the receptacle adapter of FIG. 8 consistent with at least one embodiment of the invention.

FIG. 11 illustrates a perspective, peripheral-side view of the receptacle adapter of FIG. 8 consistent with at least one embodiment of the invention.

The use of the same reference symbols in different drawings indicates similar or identical items.

DETAILED DESCRIPTION

Figure 1:
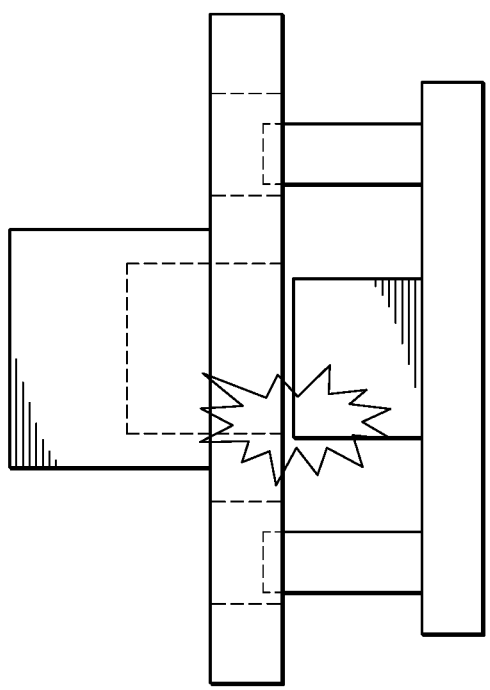
FIG. 1 illustrates a connector system including a power adapter male connector assembled with a power adapter female connector.
Figure 2:
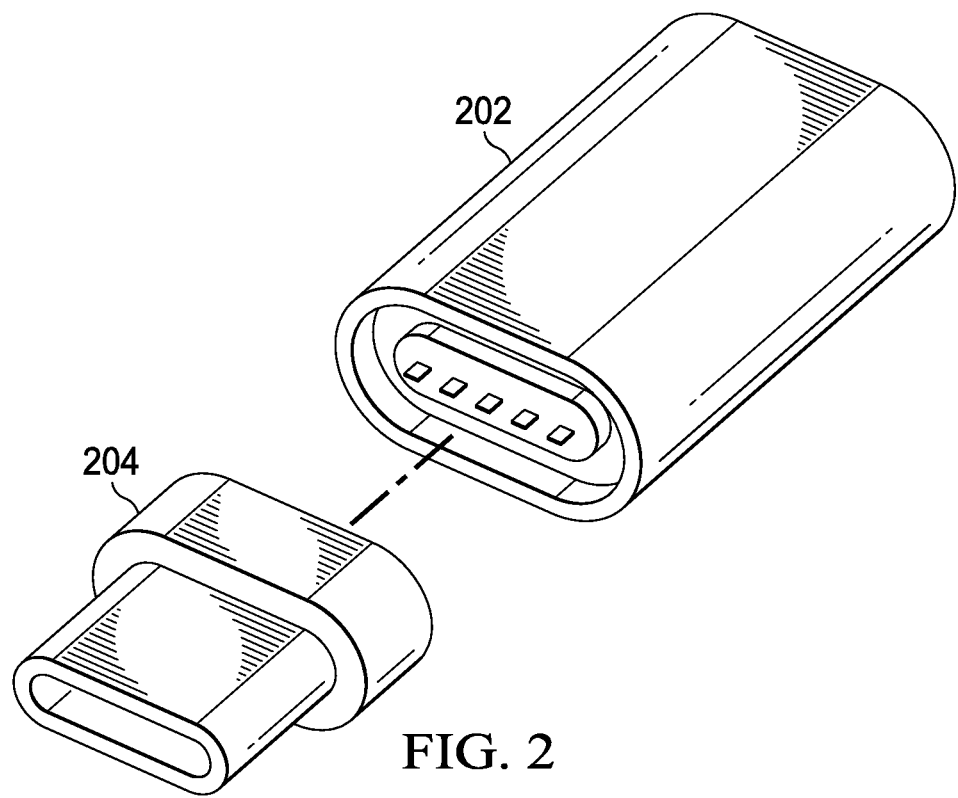
FIG. 2 illustrates a conventional magnetic connector system including a male connector and a female connector.
Figure 3:
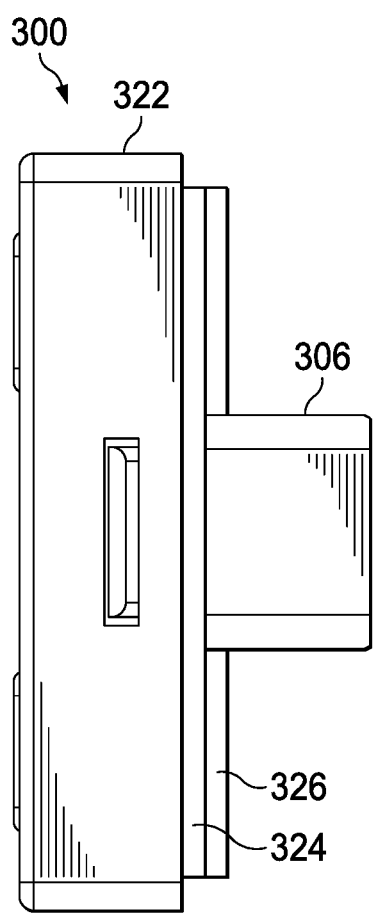
FIG. 3 illustrates a top-down view of an external plug adapter consistent with at least one embodiment of the invention.

A connector system includes a misalignment-tolerant interface that withstands misalignment errors and some misuse (e.g., forceful insertion of the portable information handling system into the charging dock in the wrong orientation). The misalignment-tolerant interface has improved alignment tolerance as compared to conventional USB Type-C connectors that enable USB Type-C charging of a storage device in an information handling system (e.g., a battery of a notebook computer or laptop computer) in a charging dock (e.g., charging cart, charging tray, charging station, or charging basket). The connector system does not require electrical or mechanical changes to existing portable information handling devices since the connector system connects to a default USB Type-C I/O port (e.g., similar to a wireless mouse or keyboard dongle). An external plug adapter of the connector system includes a robust power interface that has increased tolerance to assembly errors as compared to conventional Type-C connectors.

In at least one embodiment, the connector system includes an external plug adapter and receptacle adapter having a misalignment-tolerant electrical interface and a magnetic interface. The misalignment-tolerant interface includes conductive pads of the external plug adapter that electrically and mechanically couple to corresponding conductive pins of a receptacle adapter. The conductive pads have a larger diametrical contact surface area that caters to increased tolerance errors between the conductive pins and the conductive pads. The receptacle adapter includes a circumferential rib wall that improves alignment of the adapters before electrical connection to prevent conductive pin damage. In some embodiments, the magnetic connection allows easier disengagement of a portable information handling system from a mating connector in a charging dock and reduces induced stress, thus increasing the lifetime of the connector as compared to a conventional 7.4 mm barrel connector. In other embodiments of the connector system, the magnetic function is omitted.

Referring to FIGS. 3-7, in at least one embodiment, external plug adapter 300 includes printed circuit assembly 310, which includes conductive pads 302 (e.g., six conductive pads formed from gold, copper, or other suitable conductive material) that provide electrical connection between conductive pins of a receptacle adapter and an electronic interface of a host-side of external plug adapter 300 (e.g., a host-side USB Type-C interface). External plug adapter 300 includes male USB Type-C connector 306 that provides an electrical connection to a USB Type-C port of a portable information handling system. In other embodiments, external plug adapter 300 and the portable information handling system each include an electronic interface consistent with another protocol including power supply terminals. In other embodiments, external plug adapter 300 includes a female host-side USB Type-C connector, the USB Type-C port of the portable information handling system is male, and conductive pads 302 are coupled to power supply signals provided by male USB Type-C connector 306.

In at least one embodiment, peripheral-side of external plug adapter 300 includes at least one ferromagnetic plate (e.g., two plates formed of ferromagnetic steel) that provides a mechanical connection to a corresponding magnet of a receptacle adapter. Housing 322 is an enclosure for holding printed circuit assembly 310, which includes conductive pads 302, male USB Type-C connector 306, and ferromagnetic plates 304 and 305. Housing 322 is formed from a polymer, e.g., polycarbonate acrylonitrile butadiene styrene (PC-ABS), thermoplastic polyurethane (TPU) overmold, thermoplastic elastomer (TPE) overmold, or other suitable material and includes openings 323 that expose conductive pads 302 and ferromagnetic plates 304 and 305 on a peripheral-side of external plug adapter 300. In other embodiments, external plug adapter 300 does not include ferromagnetic plates 304 and 305.

In some embodiments conductive pads 302 have a smaller diameter than openings 323 when receiving conductive pins that each contact a conductive pad at a top of a hemispherical dome of the conductive pin. Those embodiments increase an air-gap distance between conductive pads 302 and corresponding conductive pins to reduce or eliminate short circuiting of adjacent conductive pins. Conductive pads 302 can receive conductive pins disposed near the sides of openings 323 and still achieve full electrical contact. In at least one embodiment, each of openings 323 has a diameter of 2.2 mm and each of conductive pads 302 has a diameter between 1.35 mm and 2.05 mm, inclusively (e.g., each of conductive pads 302 has a diameter of 1.9 mm to achieve less than 0.3% mechanical interference failure of a mechanical assembly with a corresponding conductive having a diameter of 0.65 mm). Other embodiments include openings 323 having the same diameters as corresponding conductive pads 302 or other suitable dimensions (e.g., with openings 323 between 2.2 mm and 3.4 mm, inclusively, and conductive pads having diameters between 1.95 mm and 2.65 mm, inclusively). However, increase of the diameter of conductive pads 302, openings 323, and conductive pins increases the external plug adapter Z-dimension, which may cause the Z-dimension of housing 322 to exceed the thickness of a portable information handling device. As referred to herein, the X-axis/dimension corresponds to a left-right direction of a corresponding portable information handling system, the Y-axis/dimension corresponds to a front-to-back direction of the corresponding portable information handling system, and the Z-axis/dimension corresponds to a top-to-bottom direction of the corresponding portable information handling system, as indicated in the figures.

A host-side surface of housing 322 (i.e., a surface of housing 322 that abuts to the portable information handling system) includes flexible stopper 328 that includes flexible contact ribs 324 and 326. Flexible stopper 328 is formed from rubber, TPE overmold, or other suitable material. Male USB Type C connector 306 protrudes from an opening in housing 322 and from an opening in flexible stopper 328 and is disposed between flexible contact ribs 324 and 326. Flexible contact ribs 324 and 326 reduce twisting stress on the connector system when a vertical load is applied to external plug adapter 300. In at least one embodiment of external plug adapter 300, flexible contact rib 324 has a different height than flexible contact rib 326 to cater to a curvature or uneven profile of the portion of a portable information handling device housing to which external plug adapter 300 abuts (e.g., dimension 331 is 24.3 mm, dimension 332 is 0.53 mm, dimension 333 is 1.3 mm, and each rib has a width dimension 334 of 1.0 mm). As a result, external plug adapter 300 can be assembled to the portable information handling device with only one orientation and is unable to be assembled to the portable information handling device when rotated by 180 degrees since flexible contact rib 326 would contact the portable information handling device first and prevent full electrical connection. Although in some embodiments housing 322 and flexible contact ribs 324 and 326 are separable components, in at least one embodiment of external plug adapter 300, housing 322 and flexible contact ribs 324 and 326 are integrated into a single overmolded component (e.g., a TPE overmolded component), which reduces or eliminates tooling requirements.

Referring to FIGS. 8-11, in at least one embodiment of the connector system, a host-side of receptacle adapter 400 includes conductive pins 402 (e.g., spring-loaded conductive pins or pogo pins) that provide electrical connections between corresponding conductive pads of external plug adapter 300 and signals of an electronic interface. On a peripheral-side, receptacle adapter 400 includes female connector 404 that provides an electrical connection to USB Type-C power signals provided by a Type-C power adaptor connector. In at least one embodiment, receptacle adapter 400 includes magnets 406 and 407 (e.g., neodymium magnets) that provide a mechanical connection to ferromagnetic plates of external plug adapter 300. In other embodiments, receptacle adapter 400 does not include magnets 406 and 407. Housing 422 is an enclosure for holding conductive pins 402, female connector 404, and magnets 406 and 407 in embodiments of the connector system that include the magnetic function, and is formed from a polymer (e.g., polycarbonate acrylonitrile butadiene styrene (PC-ABS), TPU overmold, TPE overmold, or other suitable material). Machined screws 410 are inserted into openings in housing 422 and are used to attach receptacle adapter 400 to a charging dock or other structure. Receptacle adapter circumferential rib wall 428 and a housing of an external plug adapter provide guidance for aligning the external plug adapter to the receptacle adapter to cause electrical engagement. Unidirectional gap 401 (e.g., a gap of approximately 0.2 mm) between housing 322 of external plug adapter 300 and rectangular flange 403 of receptacle adapter 400 caters to a large alignment error tolerance (e.g., larger than gaps used in typical datum features).

Figure 4:
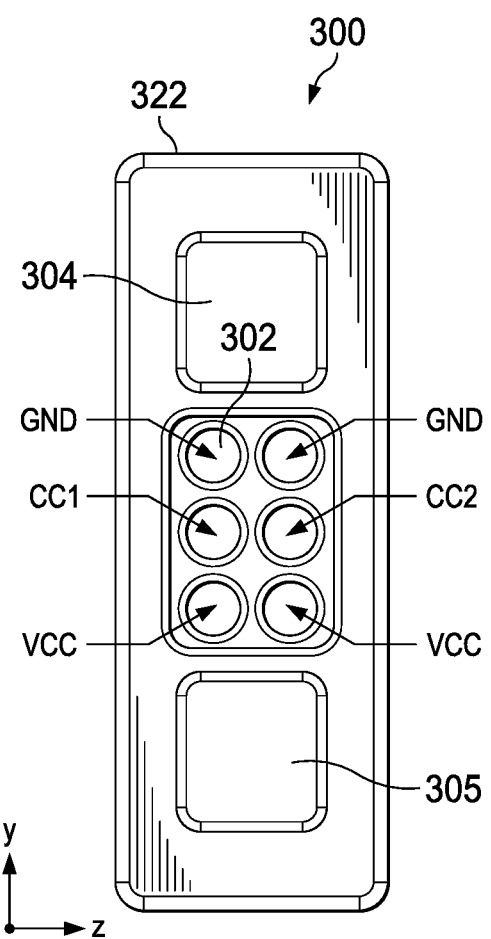
FIG. 4 illustrates a peripheral-side view of the external plug adapter of FIG. 3 consistent with at least one embodiment of the invention.

Referring to FIGS. 4 and 9, in at least one embodiment of the connector system, conductive pads 302 of external plug adapter 300 are sized to ensure that once housing 322 is positioned within receptacle adapter circumferential rib wall 428, conductive pins 402 will have electrical and mechanical contact with the conductive pads 302. Conductive pads 302 have a diametrical area that caters to positional errors in Y-dimension and a Z-dimension, thereby improving engagement of the conductive pins to the conductive pads. For example, each of conductive pads 302 has a diameter of approximately 1.9 mm and each of conductive pins 402 has a diameter of approximately 0.65 mm. In at least one embodiment, conductive pins 402 include ground pins that protrude longer than other conductive pins to allow the ground pins to be the first to contact and the last to disconnect, which ensures a safety condition that reduces occurrence of floating ground signals.

Figure 7:
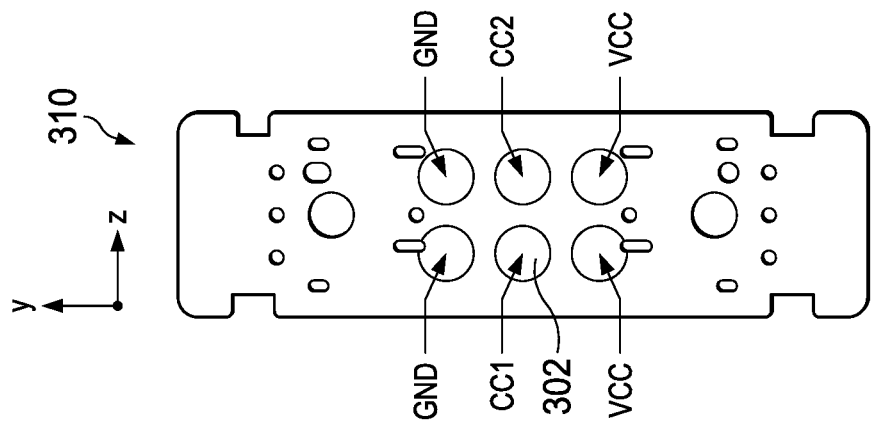
FIG. 7 illustrates a top-down view of a printed circuit assembly of the external plug adapter of FIG. 3 consistent with at least one embodiment of the invention.
Figure 6:
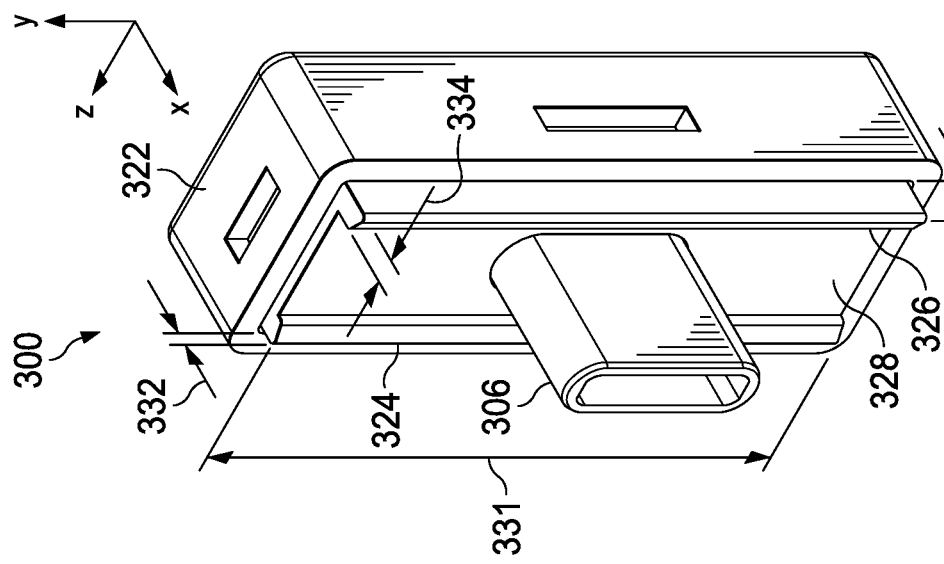
FIG. 6 illustrates a perspective, host-side view of the external plug adapter of FIG. 3 consistent with at least one embodiment of the invention.
Figure 5:
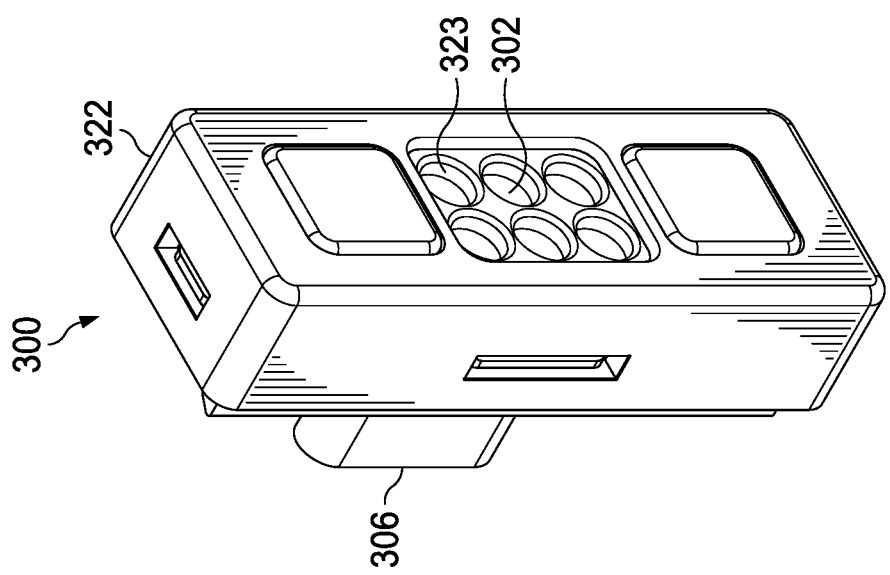
FIG. 5 illustrates a perspective, peripheral-side view of the external plug adapter of FIG. 3 consistent with at least one embodiment of the invention.

In at least one embodiment of the connector system, conductive pads 302 and conductive pins 402 are laid out in two parallel rows. External plug adapter 300 couples male USB Type-C connector 306 to USB Type-C power delivery signals of a USB Type-C input/output port of a portable information handling system to enable a USB Type-C power delivery solution that includes two power sink signals (VDD), source-to-sink configuration signals CC1 and CC2, and two power source signals (VCC). Conductive pads 302 couple those power signals (disposed as illustrated in FIG. 7) to corresponding conductive pins of a receptacle adapter. In addition, common signals GND and GND, VCC and VCC, are disposed in a left/right lateral arrangement. Source-to-sink configuration signals CC1 and CC2, also disposed in a left/right lateral arrangement, are input pins that are used to establish and manage a source-to-sink connection in USB Type-C interfaces and are not susceptible to damage if they are shorted together. Those two signals cover all portable information processing device loading orientations and all USB Type-C power adapter designs. Note that the signal layout of FIG. 7 is non-symmetrical.

In addition, the signal layout reduces or eliminates vertical shorting of signal by placing VCC terminals further apart from GND terminals and by disposing common signals laterally adjacent to each other, e.g., VCC in the left row is adjacent to VCC in the right row and GND in the left row is adjacent to GND in the right row. The signal layout enables current load balancing, up to 20V/5 A support. The layout also enables up to 60 W (e.g., 3 A×20 V) adjacent lateral common signal power delivery to continue to perform according to specifications under a single pin fault condition. In at least one embodiment of the connector system, the conductive pads coupled to GND are arranged to be disposed above conductive pads coupled to CC1 and CC2, while the conductive pads coupled to VCC are disposed below conductive pads coupled to CC1 and CC2. Accordingly, GND is first to connect and last to be disconnected. This is consistent with the direction of a charging dock mechanical release that allows undocking movement in the Y-axis (e.g., toward user pull) and slight Z-axis movement upwards. In at least one embodiment, of the connector system, the conductive pads and the conductive pins have sizes and layouts that form a misalignment-tolerant interface having at least 0.25 mm tolerance in a Y-dimension and in a Z-dimension for electrical and mechanical contact of conductive pads of the external plug adapter with corresponding conductive pins of a receptacle adapter of the connector system.

Since CC1 and CC2 do not conduct high currents, conductive pads coupled to those signals may have diameters approximately the same as the diameters of corresponding conductive pins. In at least one embodiment, conductive pads that are coupled to GND and VCC are larger than conductive pads coupled to CC1 and CC2, which improves charging capability, e.g., 20V/5 A charging, and reduces or eliminates shorting (e.g., CC1 and CC2 are coupled to conductive pads with diameters of 1.9 mm, GND and VCC are coupled to conductive pads with diameters greater than 1.9 mm, but less than 2.65 mm, and all corresponding conductive pins have diameters of approximately 0.65 mm).

Figure 12:
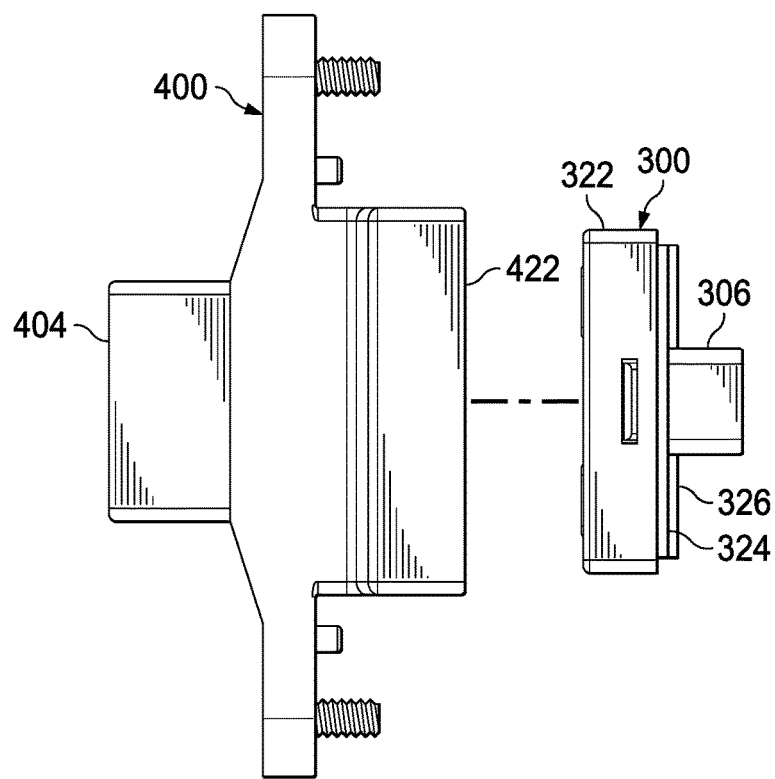
FIG. 12 illustrates a top-down view of a connector system including the receptacle adapter of FIG. 8 and the external plug adapter of FIG. 3 in a pre-mating position consistent with at least one embodiment of the invention.
Figure 14:
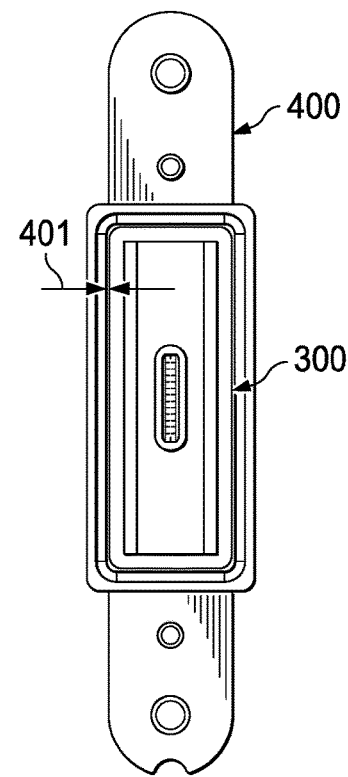
FIG. 14 illustrates a host-side view of a connector system including the external plug adapter of FIG. 3 and the receptacle adapter of FIG. 8 in a mated position consistent with at least one embodiment of the invention
Figure 13:
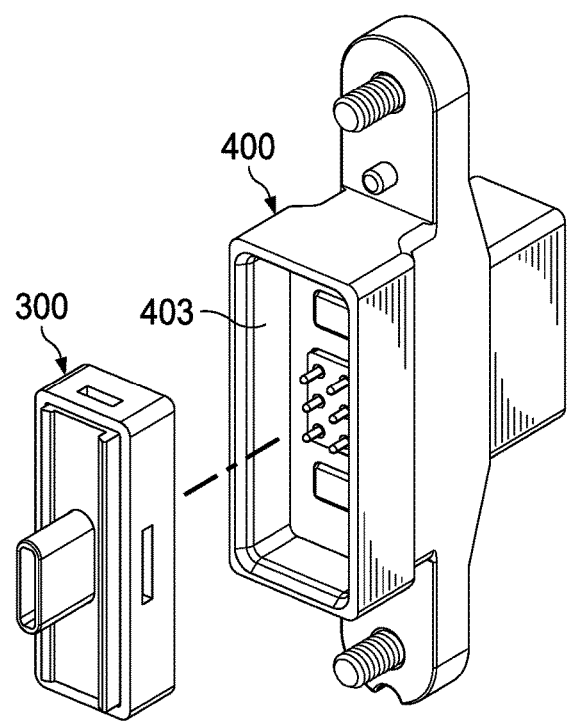
FIG. 13 illustrates a perspective, host-side view of a connector system including the external plug adapter of FIG. 3 and the receptacle adapter of FIG. 8 in a pre-mating position consistent with at least one embodiment of the invention.
Figure 15:
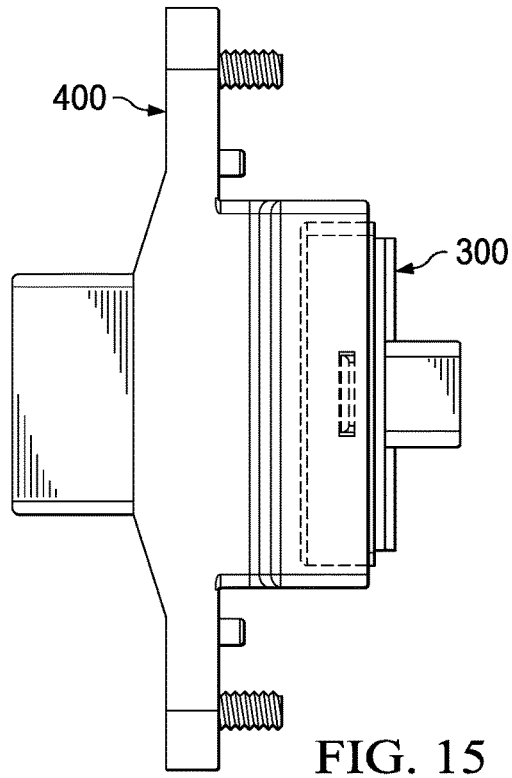
FIG. 15 illustrates a top-down view of a connector system including the receptacle adapter of FIG. 8 and the external plug adapter of FIG. 3 in a mated position consistent with at least one embodiment of the invention.
Figure 16:
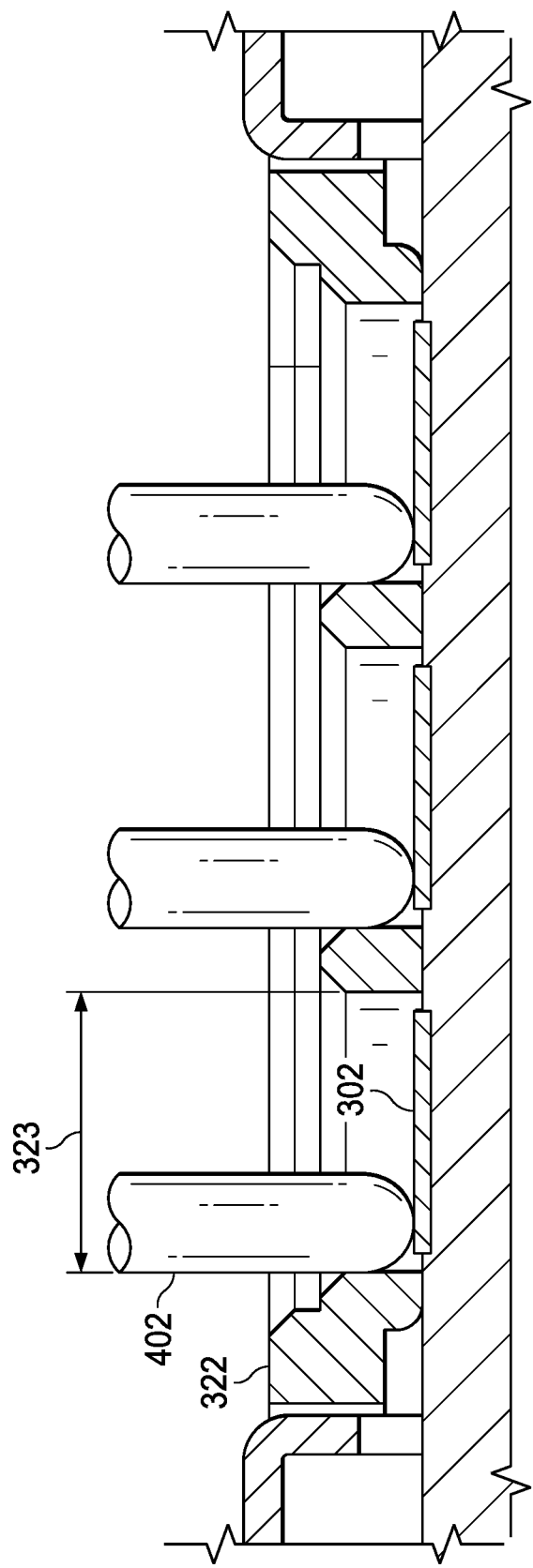
FIG. 16 illustrates a cross-sectional view of a portion of a connector system including the receptacle adapter of FIG. 8 and the external plug adapter of FIG. 3 in a mated position consistent with at least one embodiment of the invention.

FIGS. 12 and 13 illustrate pre-mated positions of receptacle adapter 400 and external plug adapter 300. FIGS. 14-16 illustrate receptacle adapter 400 mated with external plug adapter 300, including a portion of the housing of external plug adapter 300 inserted into the housing of receptacle adapter 400 and conductive pads 302 mechanically contacting conductive pins 402. Housing 322 and receptacle adapter circumferential rib wall 428 serve to align conductive pads 302 to conductive pins 402.

Figure 17:
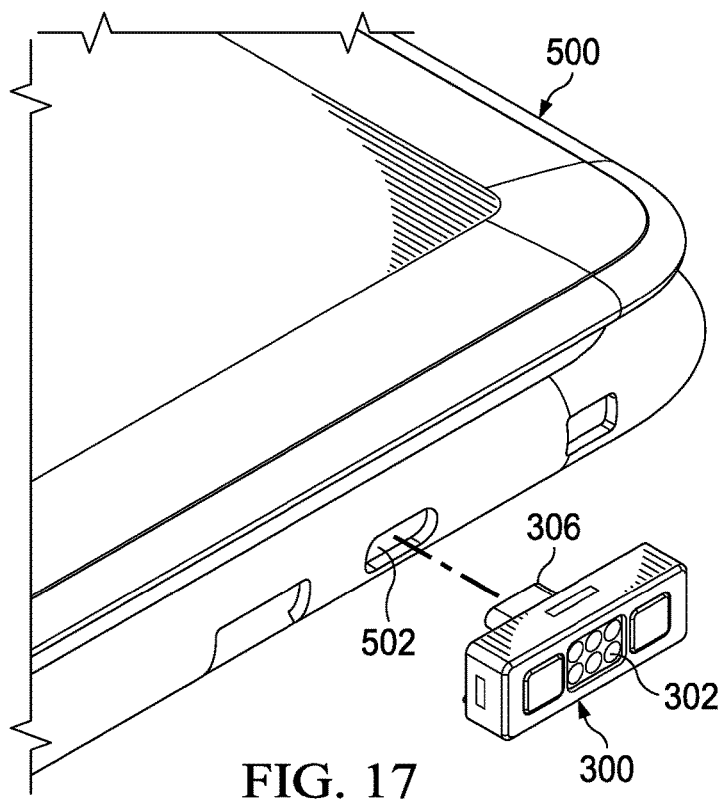
FIG. 17 illustrates a perspective view of the external plug adapter of FIG. 3 and a portable information handling system in a pre-assembly position consistent with at least one embodiment of the invention.
Figure 18:
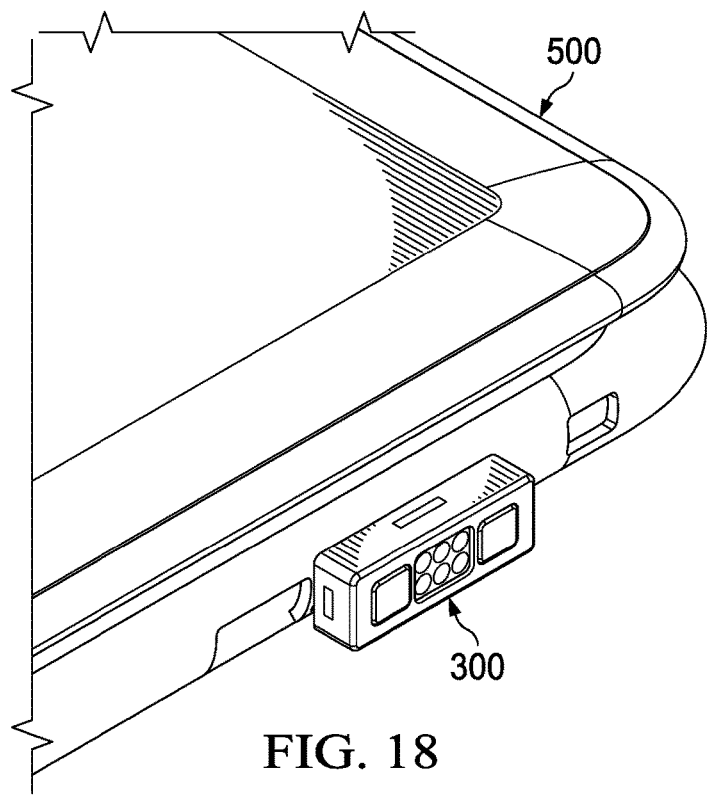
FIG. 18 illustrates a perspective view of the external plug adapter of FIG. 3 assembled with a portable information handling system consistent with at least one embodiment of the invention.
Figure 19:
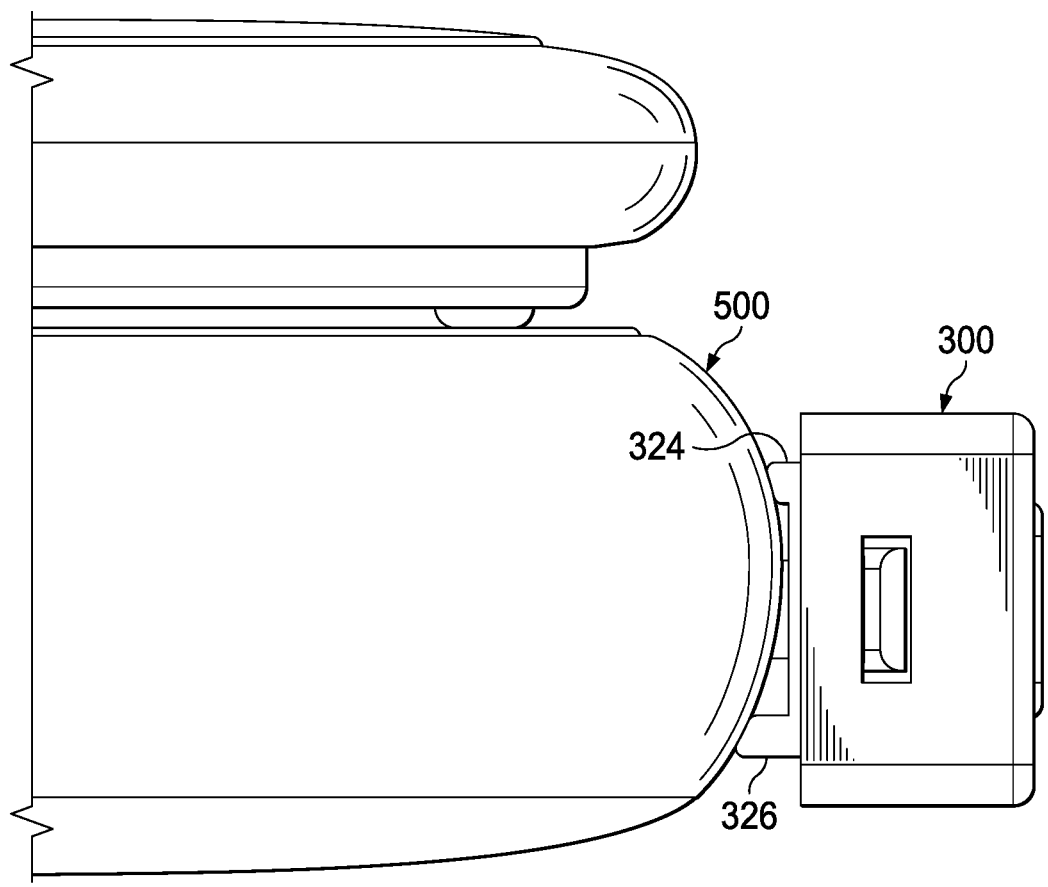
FIG. 19 illustrates a side view of the external plug adapter of FIG. 3 assembled with a portable information handling system consistent with at least one embodiment of the invention.

FIGS. 17 and 18 illustrate assembly of external plug adapter 300 with input/output port 502 of an external side of portable information processing system 500. The flexible stopper of external plug adapter 300 prevents over-insertion and withstands stress when a vertical load is applied to external plug adapter 300. Portable information handling system 500 may be inserted into a charging dock in any of multiple orientations. However, placement of the non-symmetric connector at one side of portable information handling system 500 (e.g., in a side of a palmrest of the portable information handling system 500) allows only one insertion orientation that achieves power connector engagement, although three other orientations for insertion into the charging dock are possible. In at least one embodiment, input/output port 502 is a female USB Type-C input/output port and external plug adapter 300 includes male USB Type-C connector 306. FIGS. 18 and 19 illustrate external plug adapter 300 assembled with portable information processing system 500. Note that flexible ribs 324 and 326 are in direct contact with the curved housing of portable information processing system 500. In other embodiments, the housing of portable information processing system is not curved, but is uneven, e.g., has an oblique edge, and flexible ribs 324 and 326 are in direct contact with the oblique edge. The dimensions of flexible ribs 324 and 326 (e.g., heights from the host-side surface of housing 322 of external plug adapter 300) allow the mechanical and electrical connection of input/output port 502 of portable information processing system 500 and male USB Type-C connector 306 of external plug adapter 300, thereby reducing or eliminating damage from over-insertion.

Figure 20:
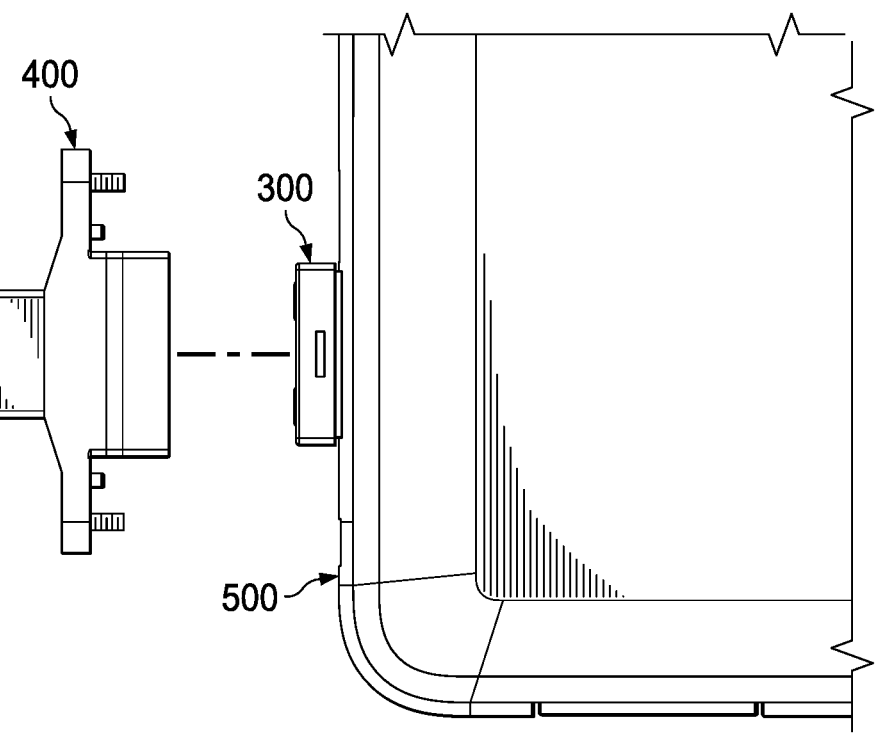
FIG. 20 illustrates a top-down view, in a pre-mating position, the connector system including the receptacle adapter of FIG. 8 and the external plug adapter of FIG. 3 assembled with a portable information handling system consistent with at least one embodiment of the invention.
Figure 21:
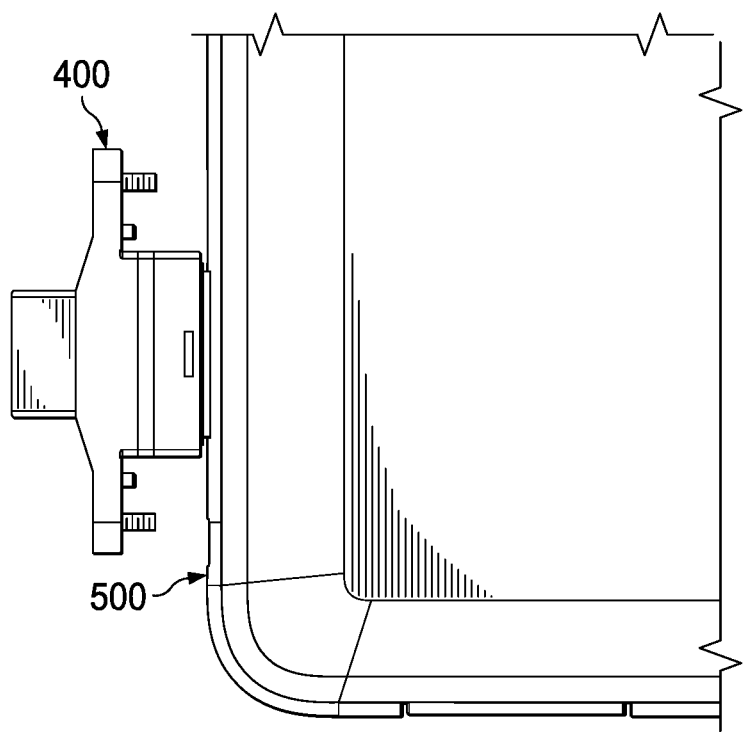
FIG. 21 illustrates a top-down view of a mated connector system including the receptacle adapter of FIG. 8 and the external plug adapter of FIG. 3 assembled with a portable information handling system consistent with at least one embodiment of the invention.
Figure 23:
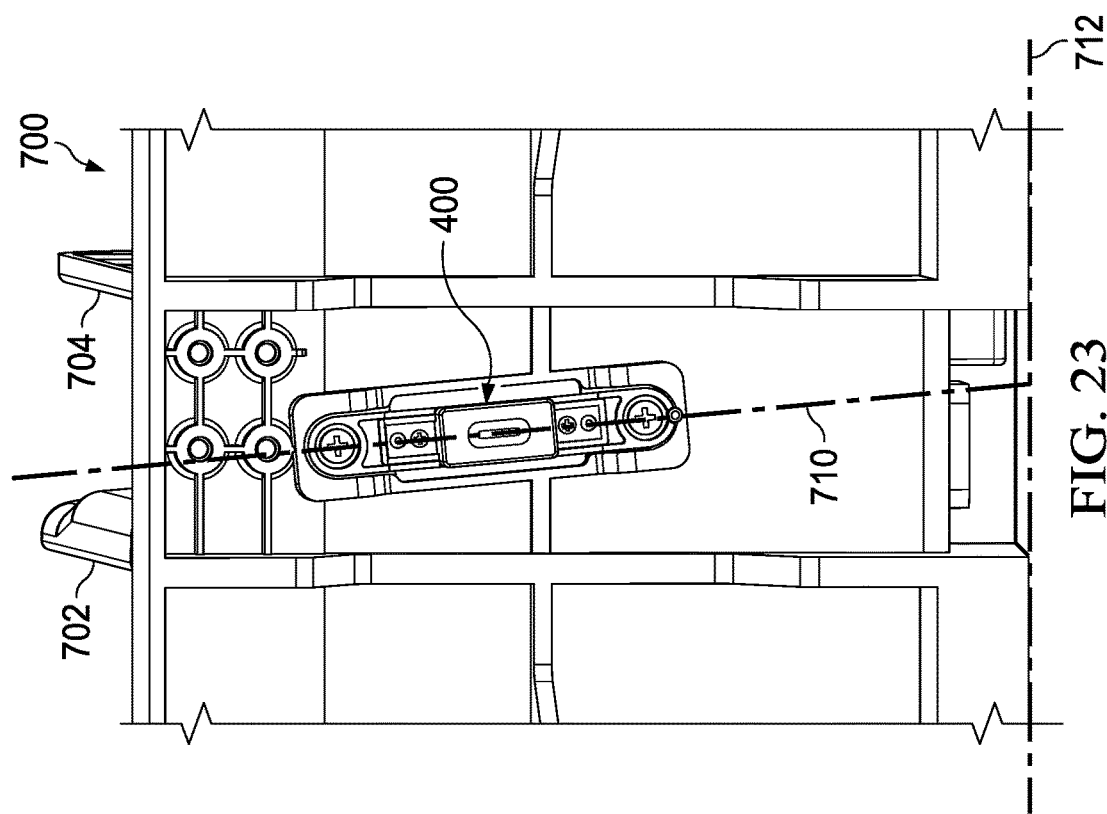
FIG. 23 illustrates a back-side view of the receptacle adapter assembled to the charging dock of FIG. 22 consistent with at least one embodiment of the invention.
Figure 22:
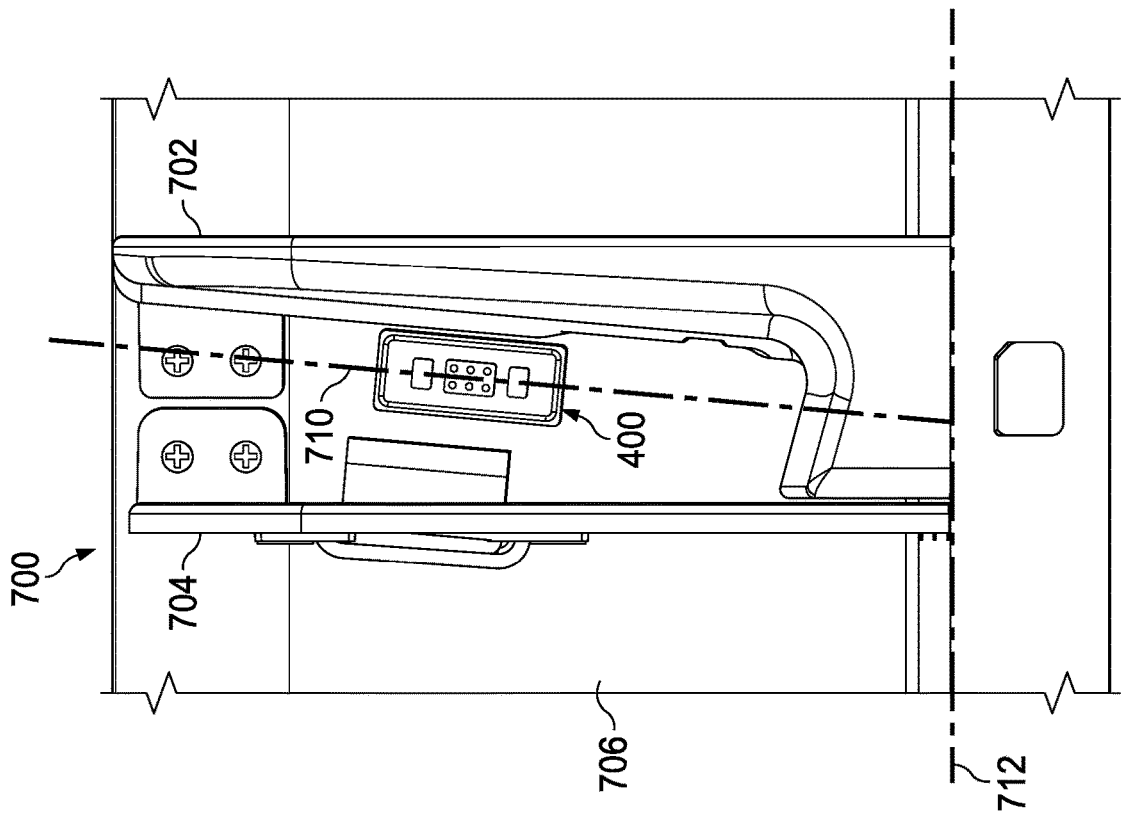
FIG. 22 illustrates a front-side view of a receptacle adapter assembled to a charging dock consistent with at least one embodiment of the invention.

FIG. 20 illustrates a pre-mated position of receptacle adapter 400 and external plug adapter 300, which is already assembled with portable information processing system 500. FIG. 21 illustrates a mated position of receptacle adapter 400 and external plug adapter 300, which is assembled with input/output port 502 of portable information processing system 500. Referring to FIGS. 22 and 23, in at least one embodiment, receptacle adapter 400 is assembled with charging dock 700, e.g., extending through an opening in rear panel 706 of charging dock 700 and secured to charging dock 700 using machined screws. When external plug adapter 300 is assembled with the portable information processing system and mated to receptacle adapter 400, the functionality of charging dock 700 is enabled. In at least one embodiment of charging dock 700, receptacle adapter 400 is assembled with an angular tilt with respect to horizontal axis 712 through a base of charging dock 700 consistent with an incline provided by charging dock segment 702, which is described further below. Charging dock segment 702 and charging dock segment 704 are also attached to rear panel 706.

Figure 24:
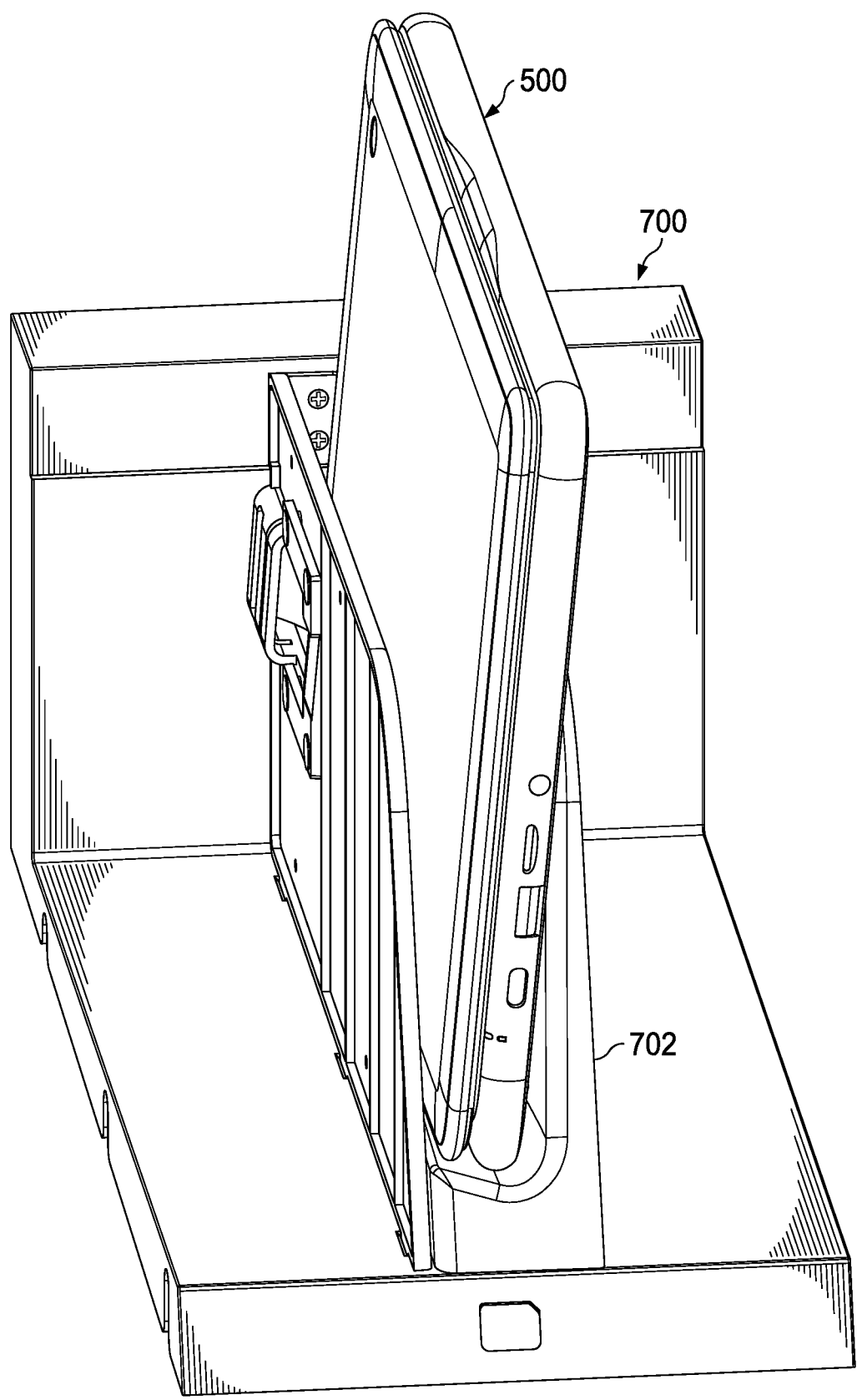
FIG. 24 illustrates a perspective, front-side view of a portable information handling system inserted in a segment of the charging dock of FIG. 22 consistent with at least one embodiment of the invention.

Referring to FIG. 24, an assembly of portable information handling system 500 and external plug adapter 300 is inserted into charging dock 700, e.g., by sliding the assembly into charging dock 700 until housing 322 is aligned with a housing guidance rib wall of receptacle adapter 400 attached to charging dock 700. In embodiments of the connector system including magnetic function, a magnetic attraction between the magnets of the receptacle adapter and ferromagnetic plates in external plug adapter 300 ensures positive engagement of the conductive pins 402 and corresponding conductive pads 302 to cause power delivery to portable information handling system 500.

Figure 25:
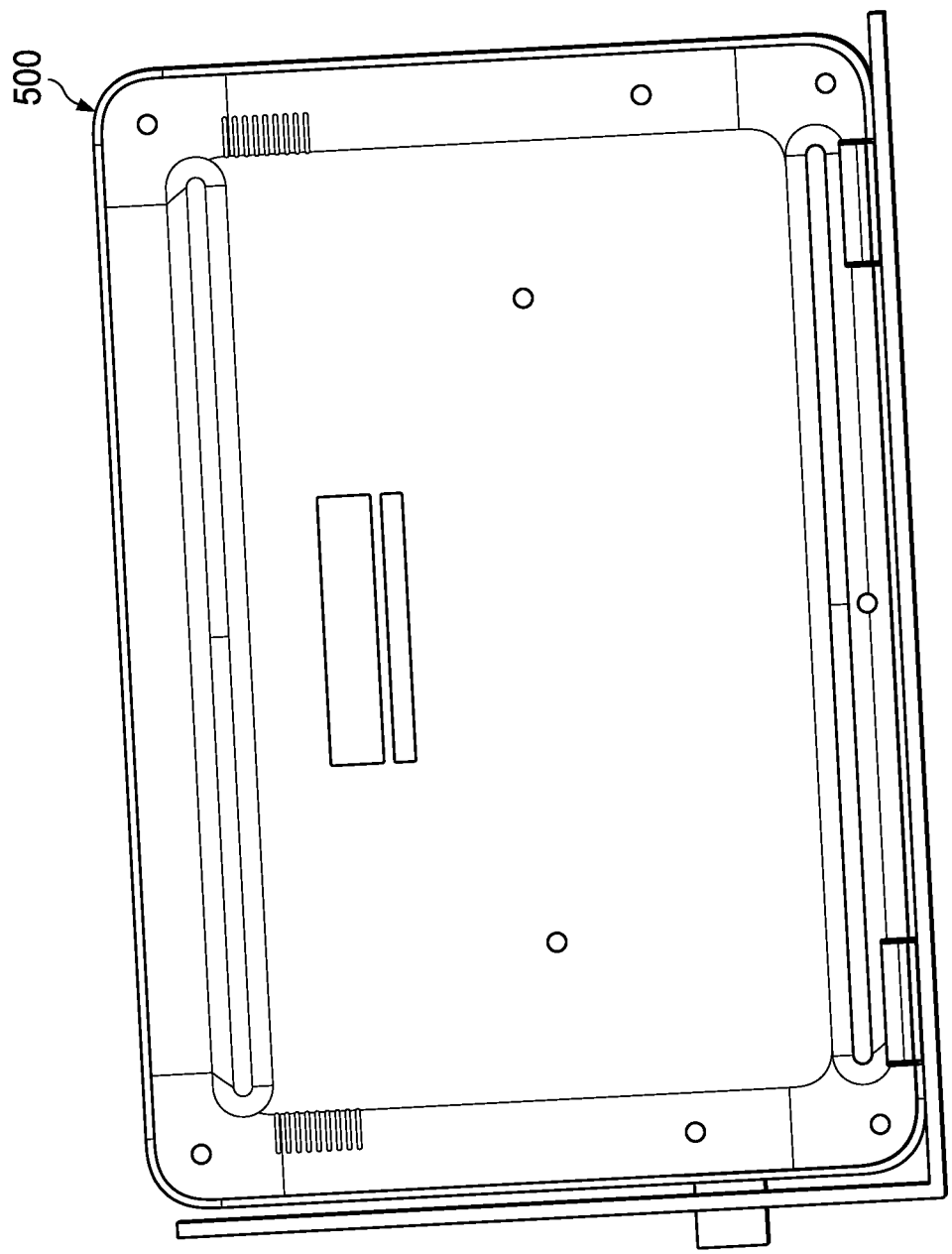
FIG. 25 illustrates a side view of a portable information handling system disposed in a charging dock of FIG. 22 consistent with at least one embodiment of the invention.
Figure 26:
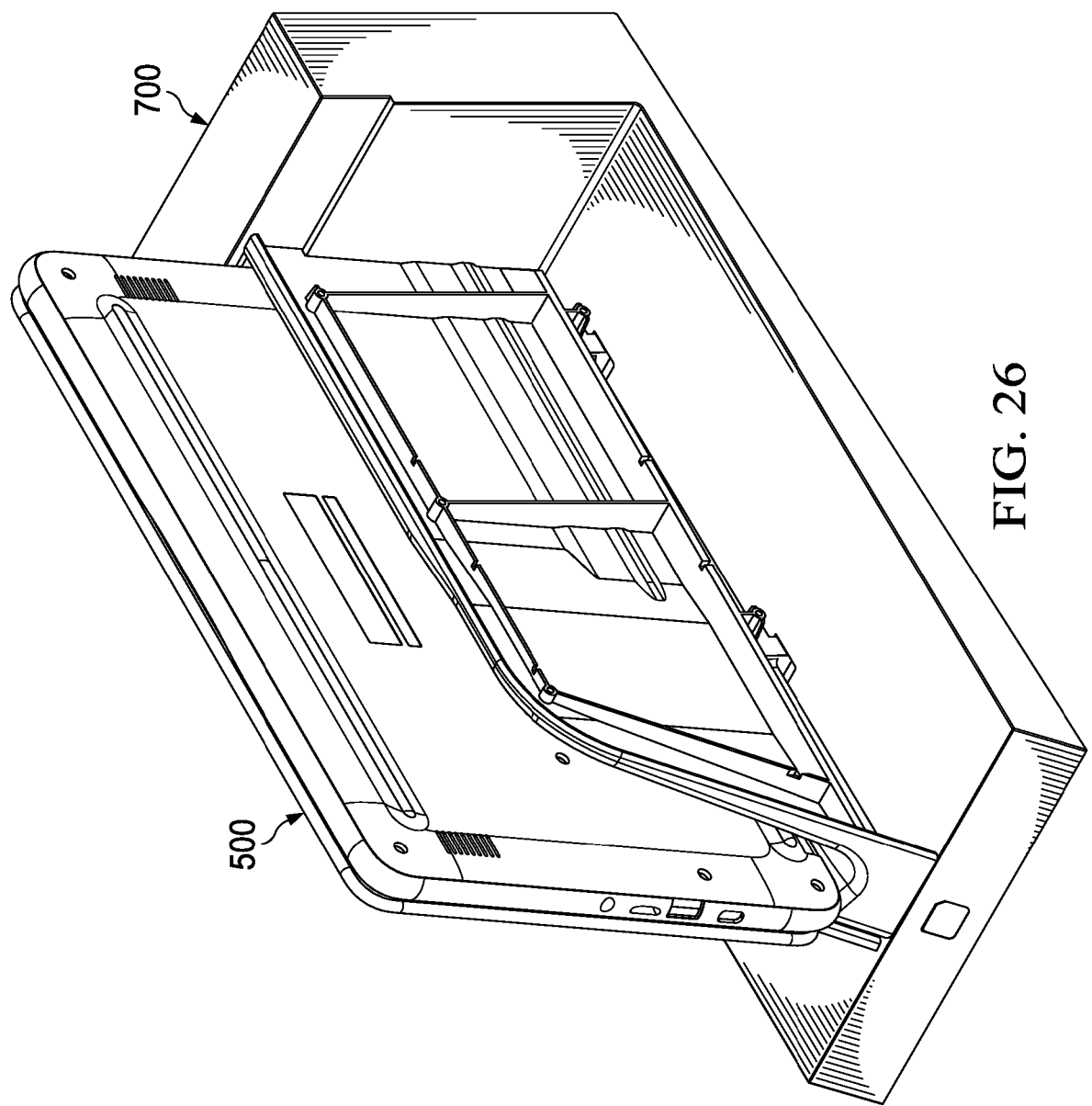
FIG. 26 illustrates a perspective view of a portable information handling system disposed in a segment of the charging dock of FIG. 22 consistent with at least one embodiment of the invention.
Figure 27:
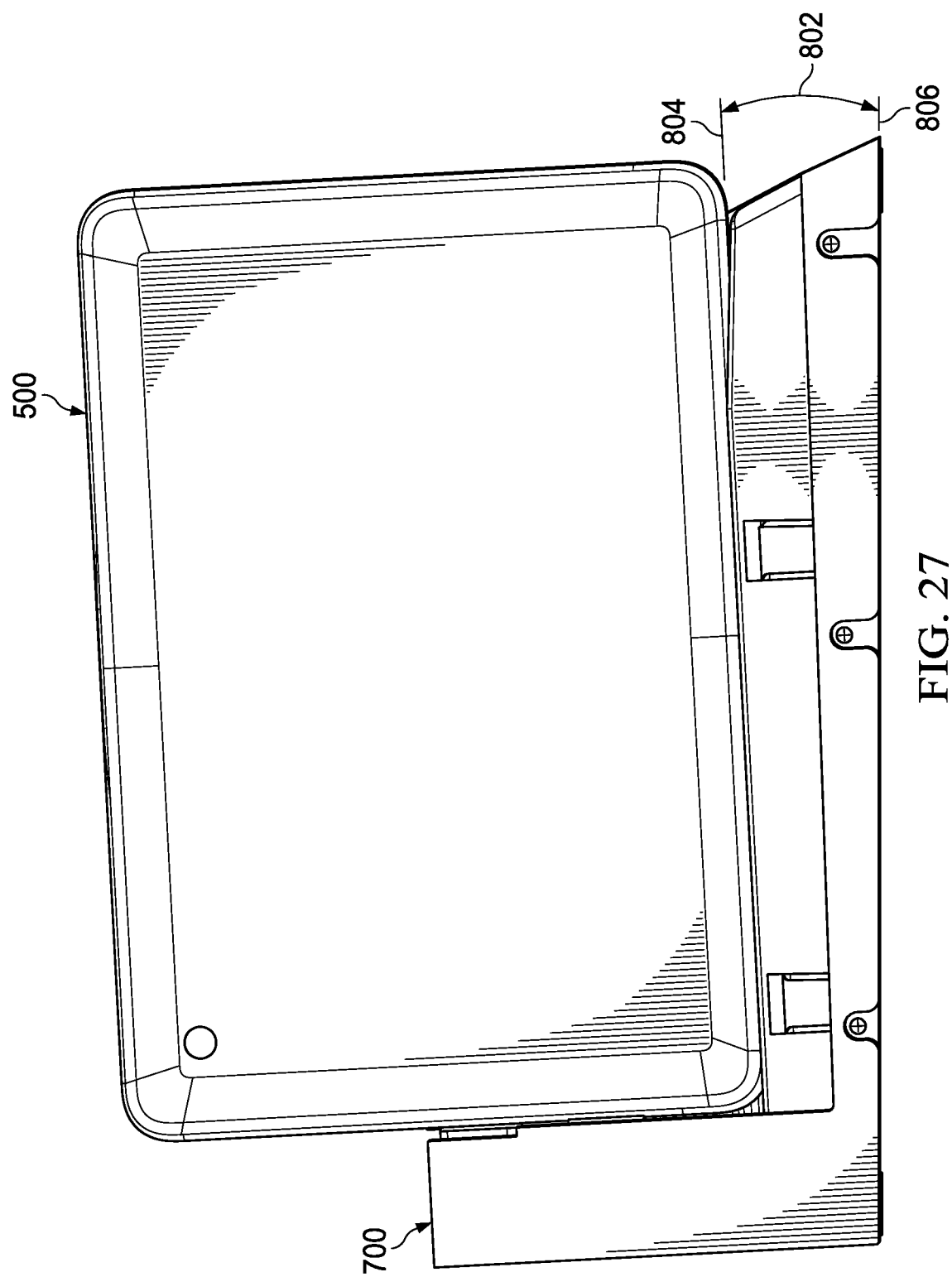
FIG. 27 illustrates a cross-sectional view of a portable information handling system disposed in a segment of the charging dock of FIG. 22 consistent with at least one embodiment of the invention.
Figure 28:
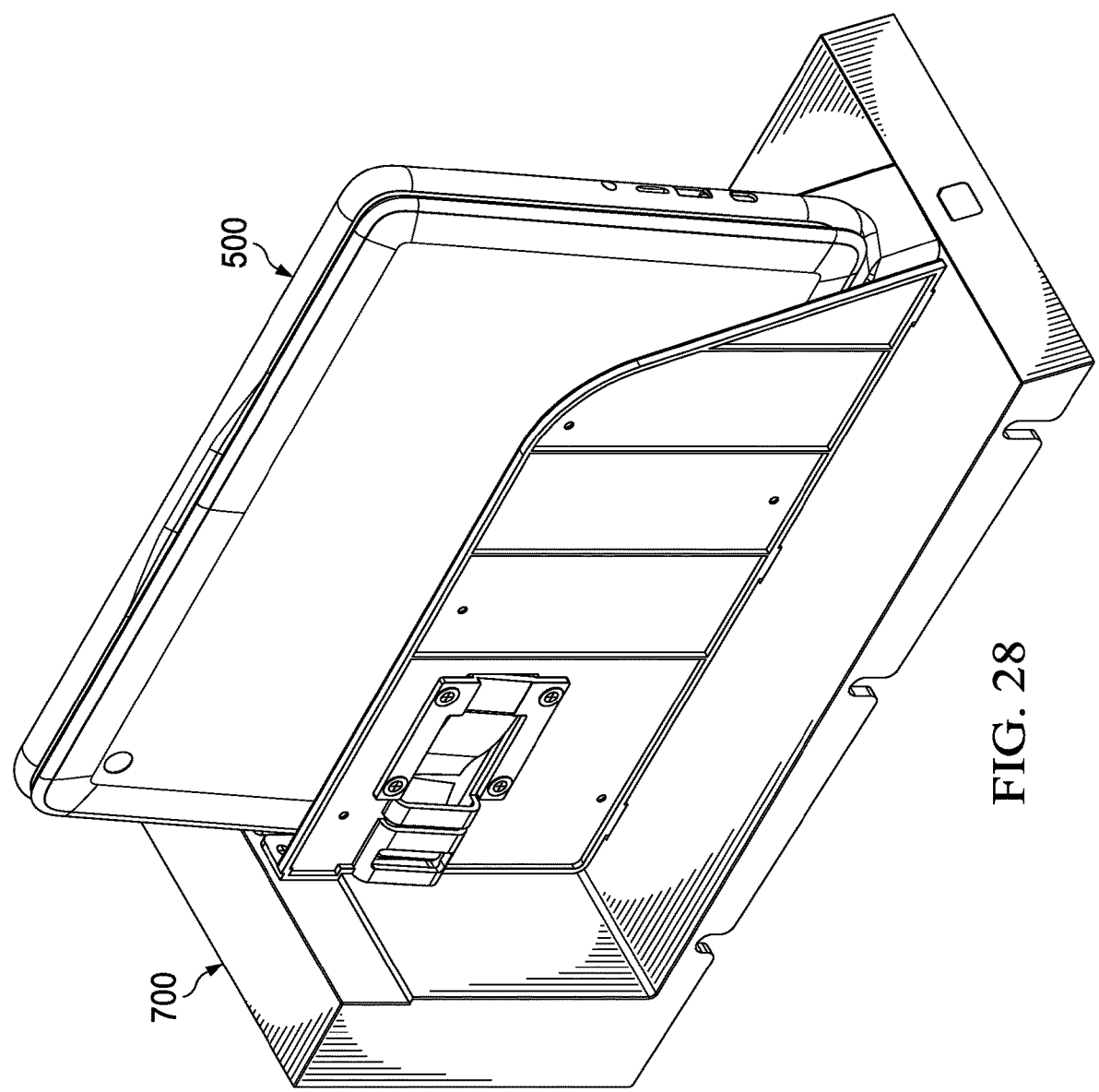
FIG. 28 illustrates a perspective view of a portable information handling system disposed in a segment of the charging dock of FIG. 22 consistent with at least one embodiment of the invention.

FIG. 25 illustrates a position of portable information processing system 500 that uses a partial weight component of the portable information processing system to contribute to a positive engagement of an external plug adapter to a receptacle adapter attached to a charging dock. FIG. 27 illustrates an embodiment of a charging dock including an inclined support surface having non-zero angular tilt 802 that causes a partial weight component of portable information processing system 500 to contribute to a positive engagement of external plug adapter 300 and receptacle adapter 400. In at least one embodiment, non-zero angular tilt 802 is approximately one degree, as measured based on a vertex of axis 806 (e.g., an axis through or parallel to a bottom surface of the charging dock) and axis 804 (e.g., an axis through an inclined support surface). However, other angular tilts may be used (e.g., 0 degree<angular tilt<45 degrees). As the angular tilt increases, the distance between the top of portable information processing system 500 to the base of the charging dock increases, thereby increasing a height specification for a shelf of each section of an associated charging dock to allow insertion of the portable information processing system without interference from a top shelf of the charging cart. The magnetic attraction force of the connector system is less than the 7.4 mm barrel removal force of a conventional barrel adapter. Although FIGS. 24-28 illustrate only charging dock segment 702 of charging dock 700, other embodiments of charging dock 700 include multiple segments (e.g., 32 or 36 charging dock segments in charging dock 700).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The description of the invention set forth herein is illustrative and is not intended to limit the scope of the invention as set forth in the following claims. For example, while the invention has been described in an embodiment in which external plug adapter 300 includes the conductive pads and receptacle adapter 400 includes conductive pins, one of skill in the art will appreciate that the teachings herein can be utilized with external plug adapter 300 including conductive pins and receptacle adapter 400 including conductive pads. The terms "first," "second," "third," and so forth, as used in the claims, unless otherwise clear by context, is to distinguish between different items in the claims and does not otherwise indicate or imply any order in time, location or quality. Variations and modifications of the embodiments disclosed herein may be made based on the description set forth herein, without departing from the scope of the invention as set forth in the following claims.

What is claimed is:

1. An information handling system comprising:
a connector system comprising:
a first electronic interface consistent with a protocol including power supply terminals and other terminals and having a first mating designation;
a misalignment-tolerant interface coupled to the power supply terminals of the first electronic interface, the misalignment-tolerant interface configured to provide electrical and mechanical connection of the power supply terminals to corresponding conductors of the connector system; and
an external plug adapter comprising:
a housing mechanically coupling the first electronic interface and the misalignment-tolerant interface;
a first flexible rib extending along a surface of the housing, the first flexible rib having a first height; and
a second flexible rib extending along the surface of the housing and having a second height, the second height being different from the first height,
wherein the first electronic interface is disposed between the first flexible rib and the second flexible rib.

2. The information handling system, as recited in claim 1, wherein the information handling system comprises a portable information handling system having a curved or uneven profile, the external plug adapter being capable of assembly to the portable information handling system in a first orientation and incapable of assembly in a second orientation 180 degrees rotated from the first orientation.

3. The information handling system, as recited in claim 1, wherein the misalignment-tolerant interface comprises conductive pads sized to have at least 0.25 mm tolerance in a Y-dimension and in a Z-dimension for electrical and mechanical contact with the corresponding conductors of a receptacle adapter of the connector system.

4. The information handling system, as recited in claim 3, wherein the power supply terminals include a first power source signal, a first power sink signal, a first source-to-sink configuration signal, a second power source signal, a second power sink signal, and a second source-to-sink configuration signal, and wherein the conductive pads comprises a first row of conductive pads coupled to the first power source signal, the first power sink signal, and the first source-to-sink configuration signal, and adjacent to a second row of conductive pads coupled to the second power source signal, the second power sink signal, and the second source-to-sink configuration signal, respectively.

5. The information handling system, as recited in claim 1, further comprising:

a portable information handling system comprising an input/output port attached to the external plug adapter, the input/output port having a second electronic interface consistent with the protocol and having a second mating designation.

6. The information handling system, as recited in claim 1, further comprising:

a charging dock comprising:
  a receptacle adapter of the connector system attached to a first surface of the charging dock, wherein a position in the charging dock, of the receptacle adapter, allows only one orientation for the external plug adapter to assemble with the receptacle adapter; and
  an inclined support surface configured to tilt a portable information handling system toward the first surface.

7. The information handling system, as recited in claim 6, wherein the receptacle adapter is disposed in the charging dock with an angular tilt between a first axis of the receptacle adapter and a second axis of the charging dock, the second axis being orthogonal to a second surface supporting the charging dock.

8. The information handling system, as recited in claim 1, wherein the protocol is Universal Serial Bus (USB) Type-C.

9. An information handling system comprising:

a connector system comprising:
  a first electronic interface consistent with a protocol including power supply terminals and other terminals and having a first mating designation; and
  a misalignment-tolerant interface coupled to the power supply terminals of the first electronic interface, the misalignment-tolerant interface configured to provide electrical and mechanical connection of the power supply terminals to corresponding conductors of the connector system,
wherein the power supply terminals include a first power source signal, a first power sink signal, a first source-to-sink configuration signal, a second power source signal, a second power sink signal, and a second source-to-sink configuration signal, and
wherein the misalignment-tolerant interface comprises a first row of conductive pins coupled to the first power source signal, the first power sink signal, and the first source-to-sink configuration signal and adjacent to a second row of conductive pins coupled to the second power source signal, the second power sink signal, and the second source-to-sink configuration signal, respectively.

10. The information handling system, as recited in claim 9, wherein the connector system is configured to couple to a port of the information handling system, the connector system further comprising:

an external plug adapter comprising:
  a housing mechanically coupling the first electronic interface and the misalignment-tolerant interface;
  a first flexible rib extending along a surface of the housing, the first flexible rib having a first height; and
  a second flexible rib extending along the surface of the housing and having a second height, the second height being different from the first height,
wherein the first electronic interface is disposed between the first flexible rib and the second flexible rib.

11. The information handling system, as recited in claim 9, wherein conductive pins coupled to the first power sink signal and the second power sink signal protrude longer than other conductive pins of the first row of conductive pins and the second row of conductive pins.

12. The information handling system, as recited in claim 9, further comprising:

a receptacle adapter comprising:
  a housing enclosing the first electronic interface and the misalignment-tolerant interface,
  wherein the receptacle adapter is disposed in a charging dock with an angular tilt between a first axis of the receptacle adapter and a second axis of the charging dock, the second axis being through a base of the charging dock.

13. The charging dock, as recited in claim 12, further comprising:

an inclined tray portion configured to direct a partial weight component of a portable information handling system to a positive engagement of an external plug adapter attached to the portable information handling system.

14. The charging dock, as recited in claim 12, wherein a position in the charging dock, of the receptacle adapter, allows only one orientation for an external plug adapter to assemble to the receptacle adapter.

15. The charging dock, as recited in claim 12,
wherein the protocol is Universal Serial Bus (USB) Type-C,
wherein conductive pins coupled to the first power sink signal and the second power sink signal protrude longer than other conductive pins of the first row of conductive pins and the second row of conductive pins.

16. An external plug adapter comprising:
a first electronic interface consistent with a protocol including power supply terminals and other terminals and having a first mating designation;
conductive pads coupled to the power supply terminals of the first electronic interface, the conductive pads providing electrical and mechanical connection to a receptacle adapter, the conductive pads comprising a first row of conductive pads disposed adjacent to a second row of conductive pads, the second row of conductive pads being coupled to signals corresponding to signals of adjacent conductive pads of the first row of conductive pads; and
a housing, mechanically coupling the first electronic interface and the conductive pads.

17. The external plug adapter, as recited in claim 16, wherein the conductive pads are sized to have at least 0.25 mm tolerance in a Y-dimension and in a Z-dimension for electrical and mechanical contact with corresponding conductive pins of the receptacle adapter.

18. The external plug adapter, as recited in claim 16, further comprising:
- a first flexible rib extending along a surface of the housing, the first flexible rib having a first height; and
- a second flexible rib extending along the surface of the housing and having a second height, the second height being different from the first height,
- wherein the first electronic interface is disposed between the first flexible rib and the second flexible rib.

19. The external plug adapter, as recited in claim 16,
- wherein the protocol is Universal Serial Bus (USB) Type-C, and
- wherein the power supply terminals include a first power source signal, a first power sink signal, a first source-to-sink configuration signal, a second power source signal, a second power sink signal, and a second source-to-sink configuration signal, and
- wherein the first row of conductive pads is coupled to the first power source signal, the first power sink signal, and the first source-to-sink configuration signal, and the second row of conductive pads is coupled to the second power source signal, the second power sink signal, and the second source-to-sink configuration signal.

20. The external plug adapter, as recited in claim 19, wherein a first conductive pad of the first row of conductive pads is coupled to the first power source signal and a second conductive pad of the first row of conductive pads is coupled to the first source-to-sink configuration signal, the first conductive pad being larger than the second conductive pad.

* * * * *